Nov. 29, 1960     L. S. MARTIN     2,961,995
POULTRY FEEDER
Filed Aug. 1, 1958
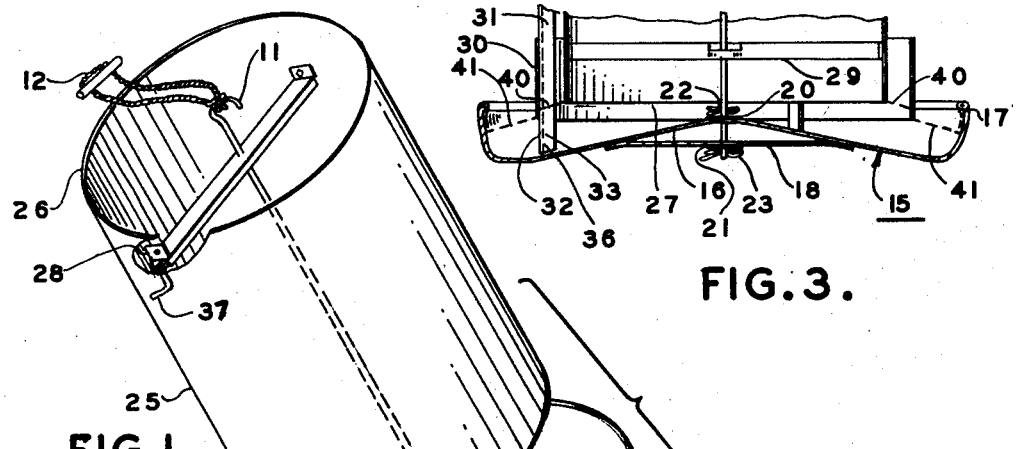
FIG. 3.
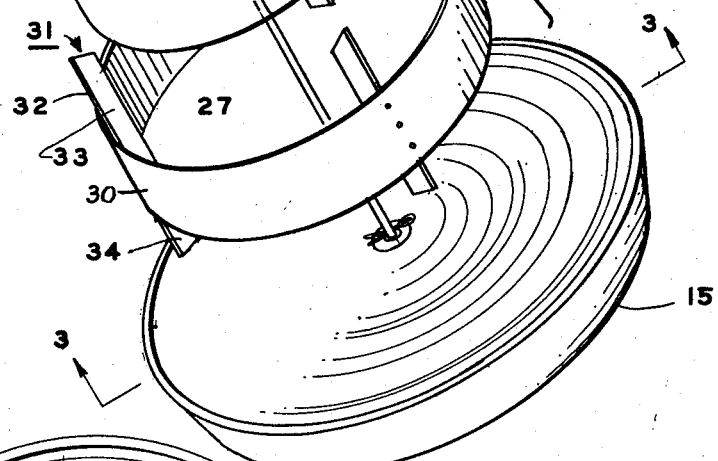
FIG. 1.
FIG. 2.
LEWIS S. MARTIN
*INVENTOR.*
BY *Henry H. Snelling*
*Attorney*

United States Patent Office 2,961,995
Patented Nov. 29, 1960

2,961,995

POULTRY FEEDER

Lewis S. Martin, % The Shenandoah Equipment Co., Harrisonburg, Va.

Filed Aug. 1, 1958, Ser. No. 752,552

4 Claims. (Cl. 119—53)

This invention relates to devices for feeding poultry and particularly to storage type tubular feeders applicable to feeding material having different flow characteristics such, for example, as grain, mash, pellets, crumlets, and other forms of feed usually consumed poultry.

The principal object of the invention is to provide a tubular dry feeder having a ring guard between the cylindrical hopper and the platform which receives the feed, the platform usually being a pan or a flat surface bounded by a low circular wall, such guard having its bottom edge elevated above the platform or pan but below the level of the bottom of the storage hopper, while the top of the guard is above the level of the lower rim of the tube hopper.

A further object of the invention is to provide a collar or guard outside a feed hopper in such a manner as to restrict the area of the exposed feed conveniently available to the chicks to an annular zone bounded by the margin of a circular pan and the guard, the areas of the zones inside and outside of the guard being equal if desired although the radial dimensions of the zones may be made either equal or the distance between the tube and the guard or collar may be less than the distance between the collar and the circular margin of the pan, this often being the preferred arrangement.

A still further object of the invention is to provide a poultry feeder in which the feeder may be suspended by a vertical standard which carries near its bottom a readily detachable circular pan above which a tubular hopper is adjustably mounted on the standard and a collar or guard is directly supported upon the pan without regard to the positioning of the tubular hopper with respect to the pan. The guard causes the exposed food discharged from the hopper to assume a stepped conical pile, the top of which is bounded by the hopper, the bottom by the pan and the stepped portion between the two conical surfaces being formed by the collar or guard.

Still further objects of the invention are as set forth in the claims and include means for reversing the guard to hold it at different elevations above the pan or platform upon which the feed rests and to provide that with the guard so positioned the tubular hopper may be raised or lowered to give maximum flow of feed consistent with minimum possibility of waste by the chicks reaching into the pan and scattering it over the edge and to the ground. When a single feeder is used for feed of different flow characetristics there is danger that, with one setting, a change of feed with cause the feed to flow or be pushed over the side of the pan from which the chicks eat.

In the present invention waste is avoided by providing a guard spaced well from the tubular hopper and also spaced well from the margin of the pan, which preferably has a circular edge. As a natural consequence of such arrangement the feed forms a cone from the bottom of the hopper to the inside surface of the guard and a cone from the guard to the inside wall of the pan with a result that should the angle of flow from the bottom of the hopper be such that a given food would overflow the pan, the setting of the guard would lower such surface and bring the feed well below the margin of the pan, thus saving waste.

Figure 1 is an exploded perspective view of the device.

Figure 2 is a plan view.

Figure 3 is a fragmentary view taken on line 3—3 of Figure 1.

The entire device is made of reasonably rust-proof material preferably galvanized iron with the central standard of ordinary iron rod, as the feeder is a highly competitive article.

The standard 10 has an upper hooked portion 11, to be attached to a rope 12, or other supporting means for holding the feeder a chosen distance above the ground so as to provide for chicks of different ages. The pan 15 preferably has a conical central portion 16, and a circular rim 17 reinforced in any desired manner. A bar 18 is welded, riveted or otherwise secured to the bottom of the pan 15 and the detachable connection between the standard 10 and the pan 15 is formed by washers 20 and 21 and cotter pins 22 and 23 which permit easy and convenient removal of the pan for cleaning, the holes for the cotters preferably being bored through the standard in such fashion as to provide minimum axial movement between the pan and the standard.

The tubular hopper 25 is open at both top 26 and bottom 27, although if desired the top may have a cover of any type. The hopper is strengthened by a pair of cross bars, 28 and 29, the former preferably being an inverted channel as illustrated so that it shields the set screw 37 which in well known manner holds the tubular hopper 25 at any desired elevation above the pan 15. The lower cross bar 29 will take any desired form, that shown being a simple flat strip centrally split longitudinally and oppositely bent semicylindrically to embrace the standard snugly but to allow easy raising and lowering of the hopper.

The guard 30 is a right cylinder of a height about the same as the depth of the pan. Secured to the guard 30 are a plurality of spacer elements, 31, each of which is preferably an angular strip having a relatively short flange 32 riveted or welded or otherwise secured to the guard 30, the larger flange 33 extending from the guard 30 inwardly so as to engage the outer surface of the hopper 25. The spacer elements 31 are unequally spaced from the edges of the guard so as to extend materially farther in one direction than in the other. The shorter section or leg 34 is shown as engaging the pan and the longer section 35 as extending upwardly above the top margin of the guard. The advantage of this configuration is that the distance from the bottom of the guard to the pan as shown in the figure can readily be increased by slipping the guard upwardly, turning it over and then replacing it.

The guard 30 is slipped over the tubular hopper 25 so that the three legs 31 or spacer elements which are positioned 120° apart rest upon the inside surface of the pan, the angle at either end of the spacer element being such that it matches the slope of the pan 15. This construction will position the guard 30 well above the pan and even when the guard is in the lowest of the two positions its upper rim will be well above the level of the rim of the pan. The hopper may now be raised to a desired position which may be such that the bottom of the hopper is as high as or higher than the level of the top of the pan. In any event it may be at a height where, except for the guard, feed of some type would spill over the margin 17 of the pan. By having the guard, the level of the feed from the bottom of the hopper to the pan is divided into two sections each with a conical surface or zone such as 40 and 41, which are annular and parallel as they are at the same angle which is the angle of repose of the particular feed being served.

The conical surfaces 40 and 41 are stepped because of the guard, the central or stepped portion being cylindrical. The net result is that by having the guard the hopper may be elevated to a point where except for the guard the food would spill over the edge but because of the guard the level at the side of the pan can be lowered to such a point that although the chicks can readily reach the food there is no danger of its spilling over the side even when the chicks shake their heads sideways, as is quite usual. The areas of the surfaces of the two zones 40 and 41 may be equal in which case the guard 30 is nearer to the pan rim than to the hopper. Conversely, if desired the guard can be exactly midway between hopper and pan margin or, as is preferable, the length of the flange 33 is such that the guard is somewhat nearer to the hopper than it is to the margin of the pan.

In its preferred form the dimensions of the parts are such that the bottom margin of the hopper may be positioned somewhat above the level of the pan margin. The top of the guard may then be as far above the bottom of the hopper as the bottom margin of the guard is above the pan, assuming that the guard has its shorter legs down as illustrated. When the guard is reversed and the hopper is in its highest position the bottom of the hopper will be at about the mid position of the guard and the level of the margin of the pan will be slightly below the level of the bottom of the hopper but well above the bottom of the guard.

What I claim is:

1. In a feeder for dry bulky poultry food such as mash, pellets, crumlets, etc., the combination with a feed pan having a central standard, and a cylindrical hopper tube mounted on the standard and having its open bottom in a plane normal to the axis of the tube, of a right cylindrical guard open top and bottom and positioned outside of the tube and inside of the edge of the feed pan, spaced from both and located a distance above the feed pan with its bottom margin at a lower level than the bottom of the tube, and its upper margin above said tube bottom whereby the bottom of the tube may be at the level of the top of the feed pan without loss of dry feed, and a plurality of vertical spacer members secured to the annular guard and projecting beyond the guard unequal distances at the top and the bottom of the guard so that the vertical distance between the bottom of the pan and the proximate margin of the guard when the vertical spacer members are resting upon the feed pan may be changed by reversing the guard.

2. The feeder of claim 1 in which the spacer members are angle irons, one flange of which is secured to the guard and the other flange loosely engages the tube to hold the tube and guard coaxial while permitting ready vertical movement of the tube without disturbing the pan or the guard resting on the pan.

3. A poultry feeder comprising a pan having a circular marginal edge, a standard rising axially from the pan and detachable therefrom for convenient cleaning of the pan, a cylindrical hopper open at its bottom, means for guiding the hopper to move vertically on the standard, means for holding the hopper at any desired elevation on the standard, a cylindrical guard open top and bottom, positioned coaxially of both the pan and the hopper and spaced between them to divide the feed discharged from the hopper into two annular zones, and means for holding the guard at any one of a plurality of elevations independently of the elevation of the hopper, said means including a series of vertical spacer members acting as legs and projecting beyond the guard unequal distances on the two margins of the guard so that the vertical distance between the bottom of the pan and the proximate margin of the guard may be changed by reversing the guard, whereby when the guard is positioned, the elevation of the hopper may be adjusted to raise or lower the bottom of the hopper to such distance above the bottom of the guard as to give maximum flow of feed consistent with minimum waste by the chicks.

4. As an article of manufacture for use with a feeder for dry poultry food of the type employing an open bottom hopper tube, a spaced pan coaxially below the tube and means for changing the spacing, a guard ring of sheet metal forming a right cylinder with its top and bottom margins in planes normal to the axis, and a plurality of spacer elements secured to the guard ring parallel to its axis at spaced positions, each spacer element extending unequally beyond the two margins of the guard ring so that the ends at either side are in a single plane normal to the axis, whereby when the guard is turned bottom side up on a surface, such as that of said pan, the distance from the bottom of the guard to the surface is changed with such reversal.

References Cited in the file of this patent

UNITED STATES PATENTS

| | | |
|---|---|---|
| 1,468,205 | Julian | Sept. 18, 1923 |
| 1,485,469 | Riegel | Mar. 4, 1924 |
| 2,222,369 | McLeod | Nov. 19, 1940 |
| 2,522,634 | Pittenger | Sept. 19, 1950 |
| 2,593,879 | Harry | Apr. 22, 1952 |
| 2,854,949 | Wiggins | Oct. 7, 1958 |
| 2,884,899 | Jackes et al. | May 5, 1959 |